United States Patent
Kralits et al.

(10) Patent No.: US 11,951,661 B2
(45) Date of Patent: Apr. 9, 2024

(54) PROCESS AND ARTICLE PRODUCED BY INJECTION MOLDING

(71) Applicant: International Automotive Components Group NA, Inc., Southfield, MI (US)

(72) Inventors: Friedrich Rudolf Kralits, Schomberg (CA); Sandor Palvoelgyi, E.U. (AT); David Mark Pascoe, Aurora (CA); Susan M. Kozora, Milford, MI (US); Benedetto Reginella, Bradford (CA)

(73) Assignee: International Automotive Components Group NA, Inc., Southfiled, MI (US)

( * ) Notice: Subject to any disclaimer, the term of this patent is extended or adjusted under 35 U.S.C. 154(b) by 0 days.

(21) Appl. No.: 17/540,582

(22) Filed: Dec. 2, 2021

(65) Prior Publication Data

US 2022/0168928 A1    Jun. 2, 2022

Related U.S. Application Data

(60) Provisional application No. 63/120,465, filed on Dec. 2, 2020.

(51) Int. Cl.
| | |
|---|---|
| *B29C 44/00* | (2006.01) |
| *B29C 44/08* | (2006.01) |
| *B29C 44/42* | (2006.01) |
| *B29C 44/58* | (2006.01) |
| *B29K 105/06* | (2006.01) |

(52) U.S. Cl.
CPC .......... *B29C 44/083* (2013.01); *B29C 44/428* (2013.01); *B29C 44/585* (2013.01); *B29K 2105/06* (2013.01)

(58) Field of Classification Search
CPC ........................... B29C 44/083; B29C 44/585
See application file for complete search history.

(56) References Cited

U.S. PATENT DOCUMENTS

| | | | |
|---|---|---|---|
| 2002/0094428 A1* | 7/2002 | Nomura | B29C 45/56 428/297.4 |
| 2014/0077406 A1 | 3/2014 | Okamoto et al. | |
| 2018/0001528 A1* | 1/2018 | Kawamura | B29C 45/2614 |
| 2018/0094809 A1* | 4/2018 | Lochschmied | F23D 14/60 |

(Continued)

FOREIGN PATENT DOCUMENTS

| | | |
|---|---|---|
| WO | 2014001394 A1 | 1/2014 |
| WO | WO-2021100645 A1 * | 5/2021 |

OTHER PUBLICATIONS

High melt strength Polypropylene (Year: 2023).*

(Continued)

*Primary Examiner* — Alison L Hindenlang
*Assistant Examiner* — Debjani Roy
(74) *Attorney, Agent, or Firm* — Grossman, Tucker, Perreault & Pfleger PLLC; Steven J. Grossman (57) ABSTRACT

The present disclosure relates to a process and article produced by injection molding. More particularly, a process and article produced by injection molding, that provides a part with one or more locations of a reduced density where such part competes in mechanical property characteristics with parts, such as vehicular components, otherwise produced from metallic materials.

12 Claims, 9 Drawing Sheets

(56) References Cited

U.S. PATENT DOCUMENTS

2020/0123341 A1\* 4/2020 Morio .................... B29C 45/00

OTHER PUBLICATIONS

General Purpose Polystyrene (Year: 2020).\*
International Search Report and Written Opinion dated Feb. 14, 2022 in corresponding PCT Patent Application No. PCT/US2021/061599.
Office Action from related PCT Appln. No. PCT/US2021/061599, dated Feb. 22, 2022.
"Daploy High-Melt-Strength PP", Borealis Foaming Guide, 9 pages, Austria, 2019.
"Polypropylene Daploy WB140HMS", Borealis Product Data Sheet, 2 pages, Ed. 2, Austria, 2019.
"Rheograph 6000 The Triple Bore Capillary Rheometer", Goettfert product description, 4 pages, Germany, 1999.
"Rheotens 71.97", Goettfert product description, 19 pages, Rev. E, Germany, 2005.
"Sabic® PP-UMS 561P (Former HEX17112) PP Homopolymer—Provisional Datasheet", Chemistry That Matters, 1 page, Revision Aug. 12, 2021.
Wu et al., "A New Core-Back Foam Injection Molding Method with Chemical Blowing Agents", Material & Design, vol. 144, pp. 331-342, 2018.
Wu et al., "Effects of Process Parameters on Core-Back Foam Injection Molding Process", Express Polymer Letters vol. 13, No. 4, pp. 390-405, 2019.

\* cited by examiner

PROCESS AND ARTICLE PRODUCED BY INJECTION MOLDING

CROSS-REFERENCE TO RELATED APPLICATIONS

The present application claims the benefit of the filing date of U.S. Provisional Application Ser. No. 63/120,465, filed Dec. 2, 2020, the teachings of which are incorporated by reference.

FIELD

The present disclosure relates to a process and article produced by injection molding. More particularly, a process and article produced by injection molding, that provides a part with one or more locations of a reduced density where such part competes in mechanical property characteristics with vehicle structural components otherwise produced from metallic materials.

BACKGROUND

Core-back injection molding has been reported, wherein a molten polymer resin including a foaming agent is injected into a mold, followed by opening of the mold, or withdrawal of a mold core, to increase the size of the mold cavity and facilitate foaming and density reduction. A need nevertheless remains in the art for a foamed or relatively light-weight part that also provides the rigidity and strength to expand the use of such parts for use in, by way of example, vehicular trim applications. Among other things, the ability to manufacture relatively lightweight parts which compete in mechanical property characteristics such as load bearing ability that is comparable to metal-based vehicle components.

SUMMARY

A method of forming an injection molded part comprising:
providing an injection mold comprising a first mold half and a second mold half that provides a molding cavity between the first mold half and the second mold half, wherein the molding cavity includes one or more locations having an initial spacing of at least 3.0 mm;
injecting a polymer composition into the molding cavity, the polymer composition including a foaming agent;
increasing said molding cavity initial spacing at said one or more locations by at least 3.0 mm; and
forming the injection molded part in the molding cavity from the polymer composition wherein the injection molded part includes a cellular structure.

A method of forming an injection molded part comprising:
providing an injection mold comprising a first mold half and a second mold half that provides a molding cavity between the first mold half and the second mold half, wherein the molding cavity includes one or more locations with an initial spacing;
providing one or a plurality of movable mold inserts wherein said inserts are capable of selectively retracting to increase said initial mold cavity spacing;
injecting a polymer composition into the molding cavity, the polymer composition including a foaming agent;
selectively retracting at least one of said mold inserts to increase said initial mold cavity spacing at a first location in said mold and maintaining the initial mold spacing at a second location in said mold.

A method of forming an injection molded part comprising:
providing an injection mold comprising a first mold half and a second mold half that provides a molding cavity between the first mold half and the second mold half, wherein the molding cavity includes one or more locations having an initial spacing;
injecting a polymer composition into the molding cavity, the polymer composition comprising: (a) a first polymer having a melt strength of greater than or equal to 20.0 cn and a melt extensibility of greater than or equal to 100 mm/sec; (b) a second thermoplastic polymer having a melt flow index of greater than or equal to 10.0 g/10.0 minutes; (c) reinforcing fiber; (d) a foaming agent;
increasing said molding cavity initial spacing at said one or more locations; and forming the injection molded part in the molding cavity from the polymer composition wherein the injection molded part includes a cellular structure.

FIGURES

The above-mentioned and other features of this disclosure, and the manner of attaining them, will become more apparent and better understood by reference to the following description of embodiments described herein taken in conjunction with the accompanying drawings, wherein.

DETAILED DESCRIPTION

It may be appreciated that the present disclosure is not limited in its application to the details of construction and the arrangement of components set forth in the following description or illustrated in the drawings. The invention(s)

herein may be capable of other embodiments and of being practiced or being carried out in various ways. Also, it may be appreciated that the phraseology and terminology used herein is for the purpose of description and should not be regarded as limiting as such may be understood by one of skill in the art.

Figure 1:
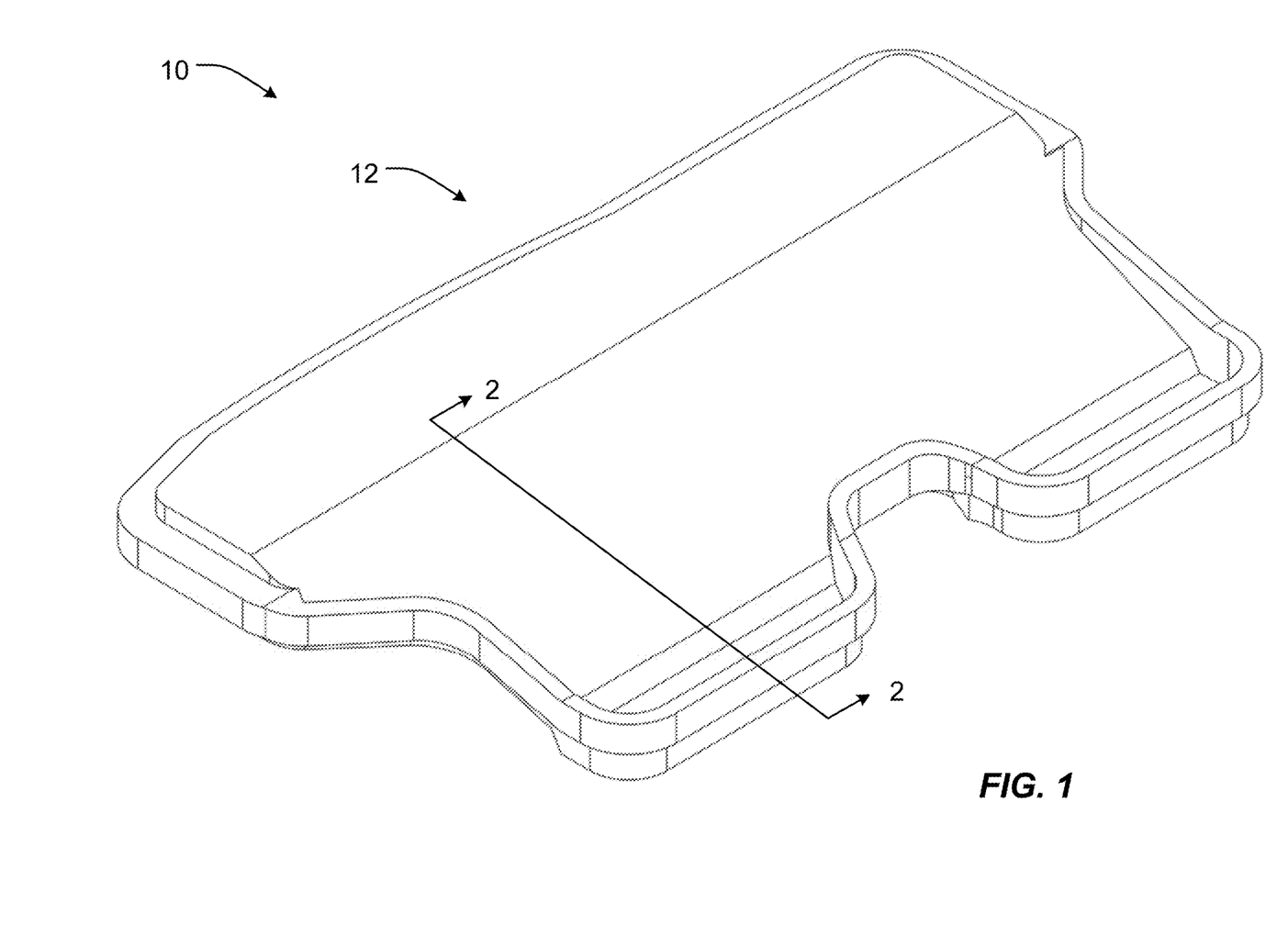
FIG. 1 is a perspective view of an article, comprising an injection molded member, according to the present disclosure.
Figure 2:
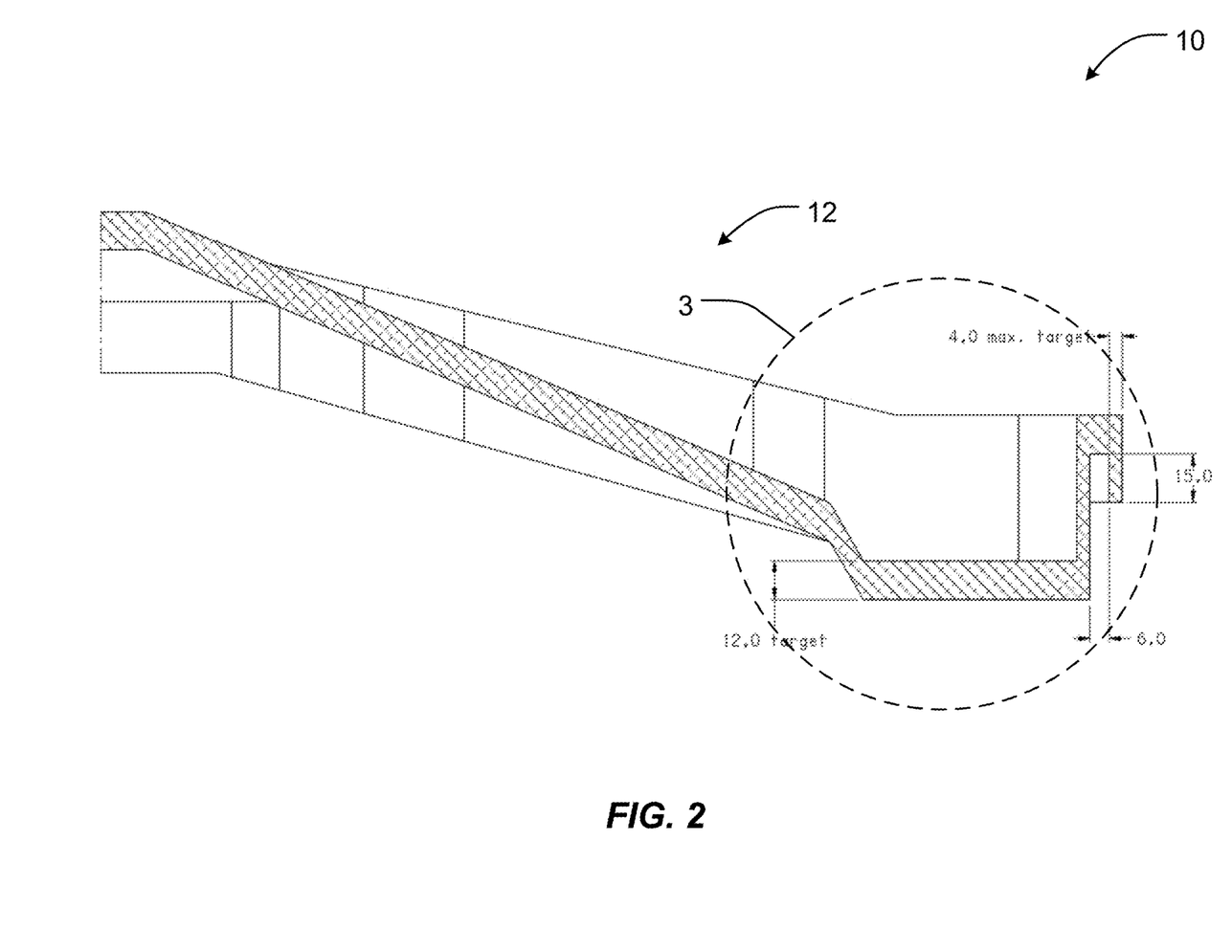
FIG. 2 is a cross-section of the injection molded member of FIG. 1 taken along line 2-2 of FIG. 1.

Referring to FIGS. 1-2, an article 10 according to the present disclosure may comprise an injection molded member 12, which may form a substrate of the article 10. In certain embodiments, the article 10 may be a load floor of a cargo region of the vehicle, which may be a cover/lid to a storage compartment which may hold a spare tire. In other embodiments, the article 10 may be a seat pan, such as a seat pan of a folding row of seats. In other embodiments, the article 10 may be a seat back for a seat, or a parcel shelf for a hatch back.

Figure 3A:
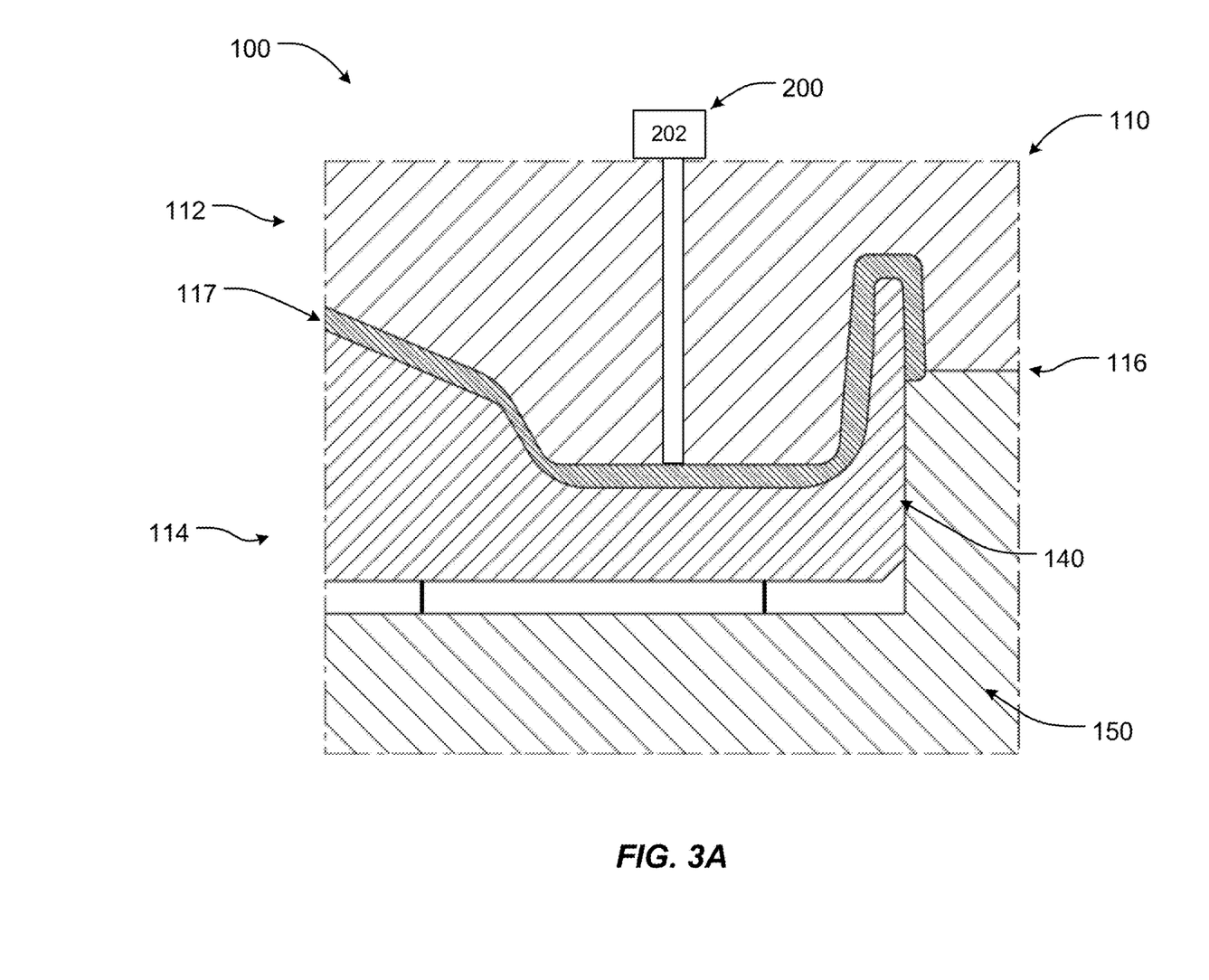
FIG. 3A is a close-up cross-sectional view of the injection mold herein wherein the mold includes two mold halves wherein the movable insert in one mold half is in an extended position to define an initial mold cavity spacing.

Referring to FIG. 3A, molding apparatus 100 comprises a mold 110 including a first mold half 112 and second mold half 114 which separate at a parting line 116. A movable insert is shown at 140 which is disposed in an extended position relative to mold base 150 to define an initial spacing 117 in the mold cavity. Shown at 202 is an injection unit 202 of injection molding machine 200.

Figure 3B:
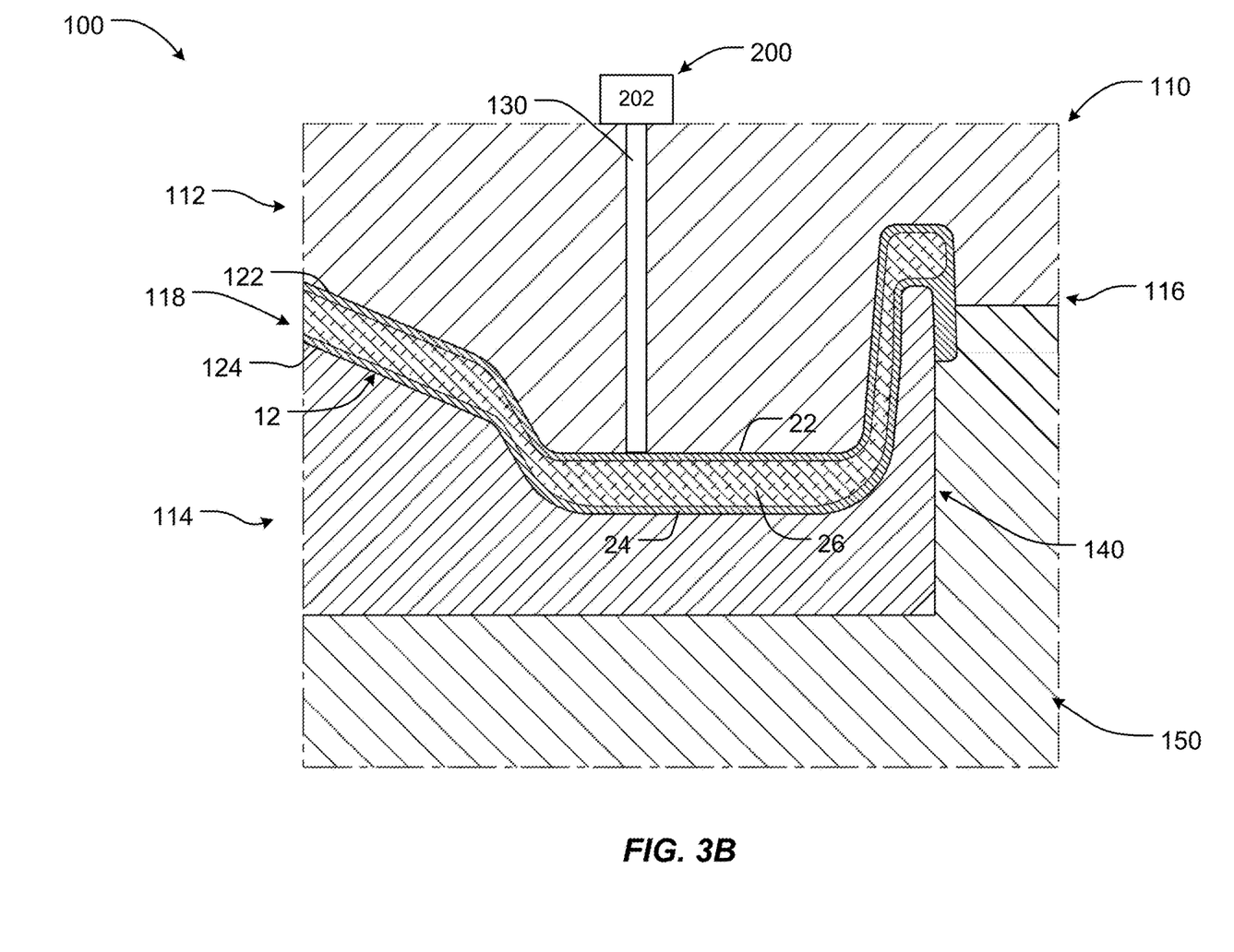
FIG. 3B is a close-up cross-sectional view of the injection molded member of FIG. 2 within circle 3 and while the injection molded member is within an injection mold.

Referring to FIG. 3B, the injection molded member 12 according to the present disclosure may be formed in a molding apparatus 100. First mold half 112 and a second mold half 114 are closeable together and the movable insert is now retracted to define a molding cavity 118, between first mold half molding surface 122 and second mold half molding surface 124, in which to form the injection molded member 12.

As shown, the first mold half 112 may be understood as the gate-side core, or (polymer composition) injection half, of the mold set 100, and the second mold half 114 may be understood as the ejector-side core, or ejector half, of the mold set 100. In certain embodiments, the second mold half 114 may be understood to form an outer, e.g. class A side/surface of the injection molded member 12 during molding (which faces vehicle occupants), while the first mold half 112 may be understood to form the inner, e.g. class B, side/surface of the injection molded member 12 (which faces the vehicle body structure). In other embodiments, the foregoing may be reversed, i.e. the first mold half 112 may be understood to form the outer surface of the injection molded member 12 during molding (which faces vehicle occupants), while the second mold half 11 may be understood to form the inner surface of the injection molded member 12.

The injection molded member 12 may be formed by delivering a molten polymer composition through a runner 130 of the first mold half 112 and/or the second mold half 114 to the molding cavity 118 from an injection unit 202 of injection molding machine 200.

The injection molded member 12 may preferably be formed of a polymer composition having a flexural modulus as measured in accordance with ASTM D-790-10 of at least 150,000 psi. at room temperature (23° C.) in order to provide sufficient rigidity, particularly to function as a substrate, to support article 10. More particularly, the polymer resin composition that is employed to form injection molded member 12 may preferably have a reported flexural modulus as measured in accordance with ASTM D-790-10 in a range of 150,000-1,500,000 psi at 23° C., and more preferably 300,000 psi to 1,000,000 psi.

In addition to providing sufficient rigidity for substrate of article 10, the composition for the injection molded member 12 preferably provides suitable load bearing ability versus temperature. As such, the injection molded member 12 may be formed of a polymer composition having a reported heat distortion temperature as measured in accordance with ASTM D-648-07 of at least 75° C. at 264 psi. More particularly, the injection molded member 12 may have a heat distortion temperature as measured in accordance with ASTM D-648-07 in a range of 75-300° C. at 264 psi, more preferably 150-300° C.

The polymer composition of the injection molded member 12 more preferably comprises a thermoplastic polymer composition, which may comprise, essentially consist of or consist of one or more polymer(s) such as polyethylene (PE), polypropylene (PP), polyurethanes (PU), polyisoprenes (synthetic or natural rubber), acrylonitrile-butadiene-styrene (ABS), aromatic based polyesters such as PET, polycarbonate (PC), polyamide (PA), polyphenylene oxide (PPO), polyamide-imides, polyetherimides (e.g. ULTEM™), thermotropic liquid crystalline polyester (e.g. XYDAR™) and aromatic polyketones, such as polyetheretherketone (PEEK) sold under the name VICTREX™, or blends thereof. One particularly preferred blend comprises polycarbonate/ABS.

In order to increase the flexural modulus and hence the rigidity or load bearing ability of the injection molded member, the thermoplastic polymer of the polymer composition may preferably be reinforced with a reinforcing additive or filler, such as reinforcement fiber and/or mineral reinforcement. Mineral reinforcement may include, e.g., silicon dioxide, calcium oxide or aluminum oxide. The reinforcing fiber may preferably include glass fiber, cellulose fiber, aramid fiber or carbon fiber. The reinforcement additive or filler may preferably be present in a range of up to 60.0% (wt.), more preferably in the range of 10.0% (wt.) to 40.0% (wt.).

The preferred length of the reinforcement fiber may be somewhat dependent on the type of injection unit 202 of injection molding machine 200, e.g. plunger v. reciprocating screw and the mold (hot runner) design. The reinforcement fiber may therefore preferably have a length in a range of 0.25 mm to 13.0 mm, and even more preferably in a range of 2.0 mm to 6.0 mm.

In addition, the polymer composition for the injection molded member 12 includes a foaming agent. The foaming agent may include a physical foaming agent, which is reference to a compound that is metered into the polymer melt and which promotes foaming without significant chemical change. Physical foaming agents therefore preferably include hydrocarbons such as isobutane, cyclopentane and isopentane, carbon dioxide, nitrogen, and flurochlorohydrocarbons. The foaming agent may also include one or more chemical foaming agents (CFAs) which decompose during the injection molding process to produce a gas such that the injection molded member 12 will be formed with a cellular (foamed) structure. In this manner, through the use of either physical foaming agent or chemical foaming agent, the density and weight of the injection molded member 12 may be reduced.

The chemical foaming agent may be either endothermic, exothermic, or a combination (mixture) thereof, and may be mixed with a carrier before being introduced to the injection molding process. Exemplary chemical foaming agents may include azobisformamide, azodicarbonamide, azobisisobutyronitrile, sodium borohydride and sodium bicarbonate/citric acid, which reacts to form sodium citrate, carbon dioxide and water. The foaming agent may also comprise an alkaline earth metal carbonate and an acid as disclosed in U.S. Patent Application Publication No. 2011/0263734 entitled "Blowing Agents Formed From Nanoparticles of Carbonates," which is hereby incorporated by reference in its entirety. The foaming agent may preferably be present in the polymer composition at a preferred level of up to 10.0% (wt), or in the range of 0.1% (wt.) to 10.0% (wt.), or more preferably in the range of 2.0% (wt) to 8.0% (wt), or in the range of 4.0% (wt) to 6.0% (wt). Particularly preferred foaming agents herein include endothermic chemical foaming agents that produce gas volumes in the range of 20 cc/gram to 100 cc/gram, more preferably 20 cc/gram to 50 cc/grams, and even more preferably, 30 cc/gram to 40 cc/gram During processing, the foaming agent may be understood to promote formation of a suitable cell structure in the injection molded member 12. The foaming agent, whether physical or chemical, preferably reduces the molded density, in a range of up to 80.0% as compared to an injection molded member 12 produced from the same polymer composition where the injection molded member 12 is substantially solid, i.e. a relatively small amount to no amount of cellular structure.

Expanding upon the above, and as more fully described herein, depending upon the operation of the mold, and in particular the ability to selectively control the expansion of the mold cavity at one or more selected locations via retraction of one or more movable inserts 140, corresponding selected locations of the molded part may be configured to experience a certain targeted density reduction, at a value of greater than 0% up to 80.0%, or even no density reduction. Reference to a density reduction should be understand as a density that is relatively lower than the density of a similarly molded part where there is no foaming agent utilized and there is no retraction and increase in the size of the mold cavity.

It is also further contemplated herein that the molded part can now be produced at one or more locations in the mold cavity with a relatively small amount or no amount of density reduction, which may be understood as density reductions of 0% to 10.0%, more preferably 0% to 5.0%, or even more preferably 0% to 2.5% or 0% to 1.0%. One may therefor now appreciate that in the broad context of the present invention, the molded part can be produced at one or more locations in the mold cavity with, e.g., a density reduction in the range of 0% to 10.0% and one or more other locations of the mold cavity can provide a part with density reductions of greater than 10.0% to 80.0%.

By way of further example, the molded part when formed in the mold cavity may have one location with a density reduction of 0-10%, another location with a density reduction of greater than 10.0.0% to 15.0%, another location with a density reduction of greater than 15.0% to 20.0%, another location may have a density reduction of greater than 20.0% to 25.0%, another location may have a density reduction of greater than 25.0% to 30.0%, another location may have a density reduction of greater than 30.0% to 35.0%, another location may have a density reduction of greater than 35.0% to 40.0%, another location may have a density reduction of greater than 40.0% to 45.0%, another location may have a density reduction of greater than 45.0% to 50.0%, another location may have a density reduction of greater than 45.0% to 50.0%, another location may have a density reduction of greater than 50.0% to 55.0%, another location may have a density reduction of greater than 55.0% to 60.0%, another location may have a density reduction of greater than 60.0% to 65.0%, another location may have a density reduction of greater than 65.0% to 70.0%, another location may have a density reduction of greater than 70.0% to 75.0%, and another location may have a density reduction of greater than 75.0% to 80.0%.

It should also be more generally appreciated that the molded part herein may have a density reduction at one location in the mold cavity that is either the same or different than the density reduction at another location. By way of example, the range of density reduction, at noted, is 0% to 80.0%. It is therefore contemplated that one may select any value in this range to promote such density reduction at one location in the mold and select another value in this range to promote a density reduction at another location in the mold, where such values are either the same or different. One may also select a density reduction for a third location in the mold, fourth location, etc., up to a tenth location in the mold. Therefore, it is contemplated herein the one may select a density reduction in the range of 0-80.0% and configure the mold to achieve any such selected density reduction in the range of 0-80.0% at up to ten different locations in the mold cavity.

Alternatively, as described more fully herein, the entirety of the part may have a selected density reduction having a value of greater than 0% up to 80%. For example, a density reduction of 10%, 20%, 30%, 40%, 50%, 60%, 70% and 80%.

During the injection molding process, the first mold half 112 and the second mold half 114 are initially set to full closure, at which time the first mold half molding surface 122 and second mold half molding surface 124 may be exposed to one another and initially spaced from one another at a distance of at least 4.0 mm, and preferably in a range of 4.0 mm to 10.0 mm. See again, FIG. 3. Such spacing may therefore correspond to the longest initial cross-sectional dimension of a given part to be molded. Accordingly, the initial spacing in the mold cavity may include one or more portions of the cavity having a spacing of at least 3.0 mm, 4.0 mm, 5.0 mm, 6.0 mm, 7.0 mm, 8.0 mm, 9.0 mm, or 10.0 mm. Therefore, the initial spacing in the mold cavity may preferably fall in the range of, as noted, 3.0 mm to 10.0 mm, or 4.0 mm to 10.0 mm, or 5.0 mm to 10.0 mm, or 6.0 mm to 10.0 mm, or 7.0 mm to 10.0 mm, or 8.0 mm to 10.0 mm or 9.0 mm to 10.0 mm.

In addition, it should be appreciated that depending upon a given part geometry, the initial spacing in the mold may be configured to be substantially uniform throughout the mold cavity (i.e. between all opposing mold surfaces defining the cavity). For example, a variation of the initial spacing in the cross-section of the mold cavity that does not vary by more than +/−10.0%.

The movable insert as noted is illustrated at 140 of the second mold half 114, which may be disposed in an extended position relative to a mold base 150 (FIG. 3) in which the movable insert 140 is contained and supported for movement. It may therefore be appreciated now that the movable insert can be set to define an initial spacing at one or more locations in the mold cavity that may fall in the range of 3.0 mm to 10.0 mm, 4.0 mm to 10.0 mm, or 5.0 mm to 10.0 mm, or 6.0 mm to 10.0 mm, or 7.0 mm to 10.0 mm, or 8.0 mm to 10.0 mm, or 9.0 mm to 10.0 mm, as described above.

Thereafter, the molten polymer composition may be delivered through the runner 130 (which may optionally be a hot runner) of the first mold half 112 to the molding cavity 118, from the injection unit 202 of the injection molding machine 200, such that the molten polymer composition completely fills the molding cavity 118. While the molten polymer composition is delivered through the injection nozzle of the injection molding machine and runner 130 of the first mold half 112, the foaming agent may begin to provide gas and form a cellular structure in the polymer composition. Optionally, the molding cavity 118 may be pressurized with counter-pressure, which inhibits or otherwise prevents the cellular structure from being formed until after the injection/shot is complete and all the of the polymer composition for forming the injection molded member 12 has been introduced into the molding cavity 118. A cellular structure herein is reference to the feature that the polymer composition, when solidified, has regions of polymer material and regions that have no polymer material, which regions can include gas due to the foaming agent, or even air.

As soon as the molding cavity 118 begins to be filled, or is completely filled, with the molten polymer composition, the movable insert 140 of the second mold half 114 may be preferably retracted at least 3.0 mm, or more preferably in the range of 3.0 mm to 40.0 mm to a retracted position relative to a mold base 150, as shown in FIG. 3B. Accordingly, the amount of retraction may be at least 3.0 mm, 4.0 mm, 5.0 mm, 6.0 mm, 7.0 mm, 8.0 mm, 9.0 mm, 10.0 mm, 11.0 mm, 12.0 mm, 13.0 mm, 14.0 mm, 15.0 mm, 16.0 mm, 17.0 mm, 18.0 mm, 19.0 mm, 20.0 mm, 21.0 mm, 22.0 mm, 23.0 mm, 24.0 mm, 25.0 mm, 26.0 mm, 27.0 mm, 28.0 mm, 29.0 mm, 30.0 mm, 31.0 mm, 32.0 mm, 33.0 mm, 34.0 mm, 35.0 mm, 36.0 mm, 37.0 mm, 38.0 mm, 39.0 mm and 40.0 mm. As such, it may be understood that when the movable insert transitions between the extended position (FIG. 3A) and retracted position (FIG. 3B), preferably, the mold halves 112, 114 do not separate at the parting line 116.

By way of further example, in the situation where the initial mold cavity opening defines one or more locations with an initial spacing of at least 3.0 mm, the movable insert may retract 3.0 mm to 40.0 mm, such that the mold cavity includes one or more locations with a spacing of 6.0 mm to 46.0 mm between opposing mold surfaces of the two mold halves. In addition, in the situation where the initial mold cavity opening defines one or more locations with an initial spacing of 10.0 mm, the movable insert may again retract 3.0 mm to 40.0 mm, such that the mold cavity then includes one or more locations with a spacing of 13.0 mm to 50.0 mm.

By way of further non-limiting example, the mold cavity may be configured such that it provides a substantially uniform initial spacing of 3.0 mm throughout the mold cavity, the movable insert may again retract 3.0 mm to 40.0 mm, such that spacing throughout the mold cavity between mold surfaces is substantially uniform at 6.0 mm to 46.0 mm. In addition, if the mold cavity is such that it provides a uniform initial spacing of 10.0 mm throughout the mold cavity, the movable insert may again retract 3.0 mm to 40.0 mm, such that the spacing in the mold is increased and is substantially uniform throughout the mold cavity at 13.0 mm to 50.0 mm.

In certain embodiments, the movable insert 140 may be a component of an ejection mechanism of second mold half 114. In such regards, after cooling, the first mold half 112 and the second mold half 114 may then be separated at the parting line 116, and the movable insert returned to the extended position, at which time the injection molded member 12 may be ejected from the second mold half 114.

Figure 3C:
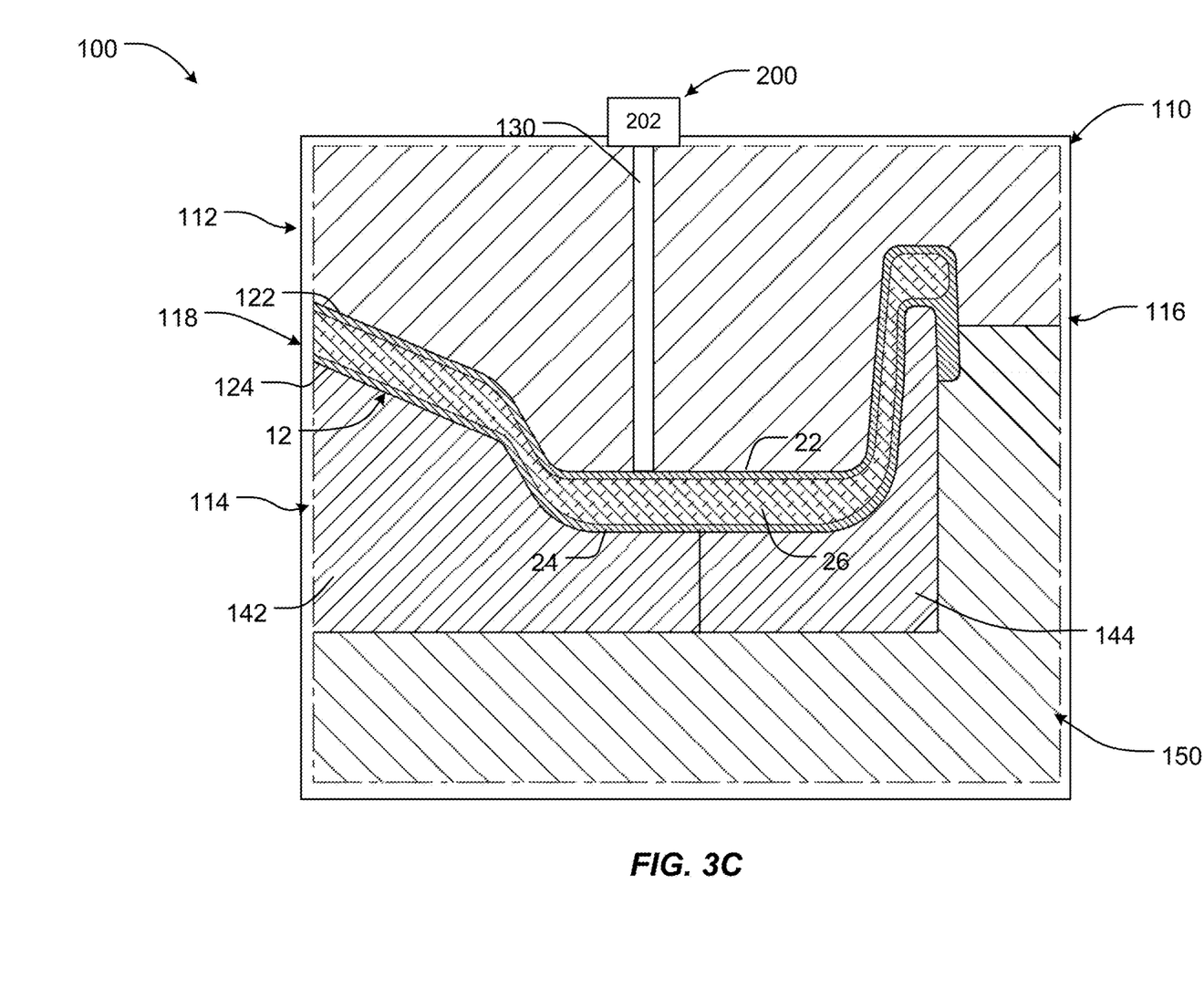
FIG. 3C is a close-up cross-sectional view of the injection molded member of FIG. 2 within circle 3 and while the injection molded member is within an alternative injection mold.

As shown in FIG. 3C, and as alluded to above, the movable insert may not be limited to a single insert as shown in FIG. 3A, as the present invention contemplates the use of one or a plurality of movable mold inserts. As shown in FIG. 3C, second mold half 114 has at least two movable mold inserts 142 and 144. Movable mold inserts 142, 144 may move in similar manner to movable insert 140. Moreover, it may be appreciated that the plurality of mold inserts, such as movable inserts 142, 144 may be moved independently or simultaneously. In other words, the movable inserts 142, 144 may be moved at the same time or different times with respect to one another.

Movable mold inserts 142, 144 may also be moved for a same period of time or different periods of time. Movable mold inserts 142, 144 may also be moved at a same velocity and/or same acceleration, or be moved at different velocities and/or accelerations with respect to one another. Movable mold inserts 142, 144 may also be moved a same distance or different distances with respect to one another. Operation of the movable mold inserts 142, 144 may be controlled with a single electronic controller or multiple individual controllers. The moveable mold inserts 142, 144 may be moved with pneumatically (compressible gas like air) or hydraulically (relatively incompressible liquid like oil).

Accordingly, in the broad context of the present invention, preferably, there may be 1-10 movable inserts that may be relied upon to increase or not increase the initial spacing of the mold cavity, at one or more locations in the cavity. Accordingly, such movable inserts may provide substantially no density reduction, the same density reduction, or a different density reduction, at one or a plurality of locations in the mold.

The present invention therefore provides for the ability to injection mold a part where a density reduction in the core layer 26 of the part is either the same or different at varying locations across a given part cross-section. Those of skill in art will therefore appreciate that, e.g., in the case where there is a minimum of 2 inserts, one location of the part may have the same or different density in the core section as compared to another location. Moreover, one location may have a relatively small amount of density reduction (0-10.0%) and another location may have a relatively larger density reduction (greater than 10.0% to 80.0%).

As shown in FIGS. 3B and 3C, across the cross-section of the injection molded member 12, the injection molded member 12 may preferably be formed with a sandwich structure of varying density, in which the two opposite sides of the injection molded member 12 exhibit two outer (skin) layers 22 and 24, respectively disposed on opposite sides of an intermediate (core) layer 26. The outer (skin) layers 22, 24, each preferably have a density which is greater than that of the intermediate (core) layer 26. The outer skin layers 22, 24 may also have a varying thickness or a relatively uniform thickness (e.g. a thickness that does not vary by more than +/−10.0%).

More particularly, the cellular structure of the injection molded member 12 may exist substantially in the intermediate (core) layer 26, while there is reduced level cellular structure in either of the two outer (skin) layers 22, 24. The outer (skin) layers 22, 24 may preferably exhibit a thickness in a range of 0.25 mm to 3.0 mm, and density which is in a range of 90% to 100% of a density of the polymer composition without a cellular structure. It may therefore be appreciated that the injection molded part herein may include an outer skin layer having a thickness in the range of 0.25 mm to 3.0 mm that has a first density $d_1$ and a core layer having a second density $d_2$, wherein $d_1 > d_2$.

Figure 3D:
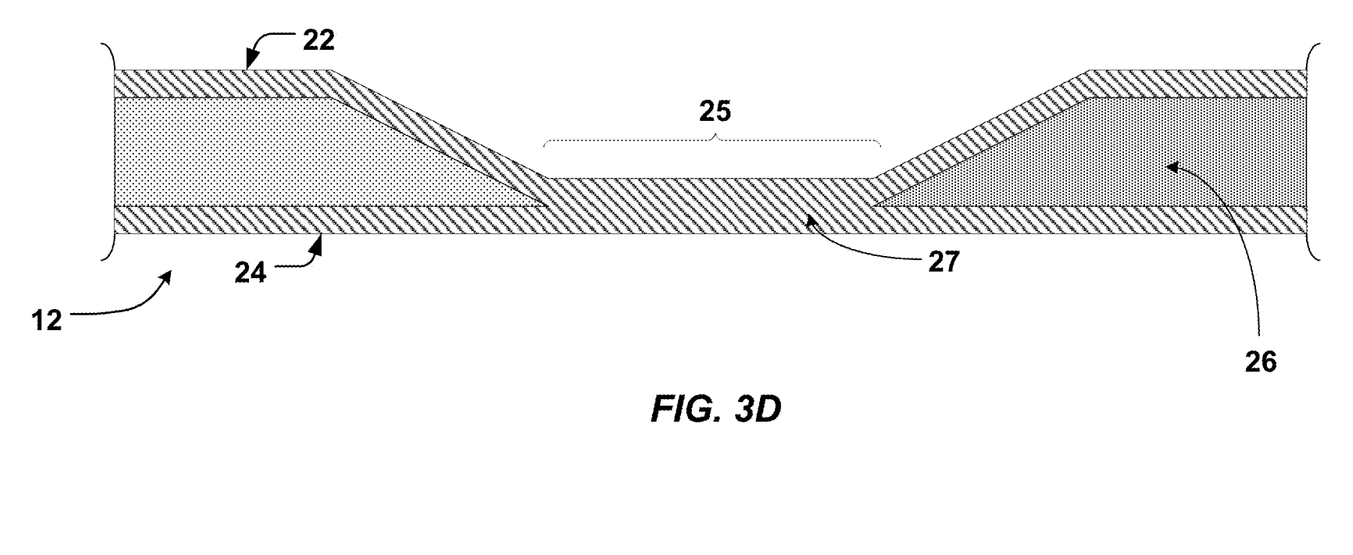
FIG. 3D is another cross-sectional view of the injection molded member illustrating a selected region of no density reduction.

Attention is directed to FIG. 3D which shows another cross-sectional view of an injection molded member 12 that can be formed herein, wherein one may preferably utilize a plurality of independently movable inserts that are configured to provide different density reductions at a plurality of location in the mold. In particular, one may selectively retract one or more of the independently movable inserts at one or more locations in the mold. At other locations in the mold, there may be movable inserts, which are then not selectively retracted, so that whatever initial mold spacing is provided is maintained.

Expanding on the above, the mold itself may be configured such that at selected locations, one may not utilize movable inserts, and the two mold halves would then, upon closing, similarly provide one or more initial mold spacings where there is no retraction and necessarily, at such location, the initial mold spacing is again maintained.

Accordingly, one may provide that at one or a plurality of regions 25, where the initial spacing is maintained, there is no retraction and relatively little to no density reduction of the injected polymer composition (e.g., 0% to 10%, or 0% to 5.0%, or 0% to 2.5%, or 0% to 1.0%). At the one or a plurality of regions where there is retraction, a resulting density reduction of the injected polymer composition that may then preferably fall in the range of greater than 10% to 80%.

The skin layer 27 that is then formed at region 25, where the initial spacing is maintained, may therefore preferably be a relatively homogenous uniform layer of polymeric material, preferably having a total thickness of 1.0 mm to 3.0 mm. Accordingly, one skin layer 25A may preferably have a thickness in the range of 0.5 mm to 1.5 mm and the other skin layer 25B may also preferably have a thickness in the range 0.5 mm to 1.5 mm.

One may also refer to the skin layer at 27 as a kiss-off region combined with one or a plurality of regions 26 of density reduction in the core layer. It may also be appreciated that the one or a plurality of regions 25, where there is relatively little to no density reduction, can serve to provide additional structure to increase loading requirements and to reduce the risk for shear failure in those regions 26 where there is foaming and density reduction.

Figure 4:
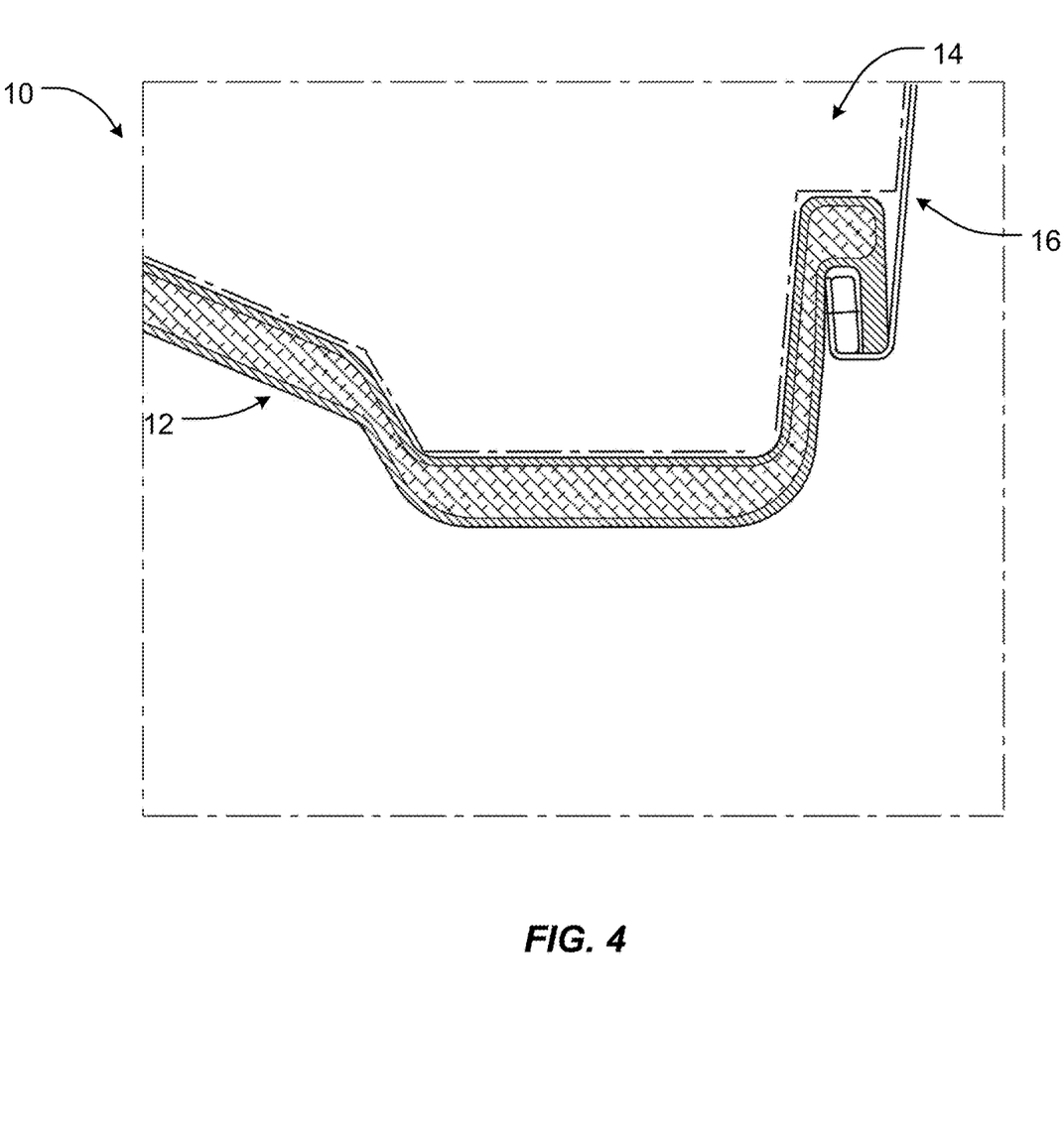
FIG. 4 is the cross-sectional view of the injection molded member of FIG. 3A in conjunction with a cushion member and a decorative cover member of the article.

Referring to FIG. 4, as a seat pan, the article 10 may further comprise a cushion member 14 and a decorative cover member 16 in addition to the injection molded member 12. The cushion member 14 may be a foam cushion.

Figure 5:
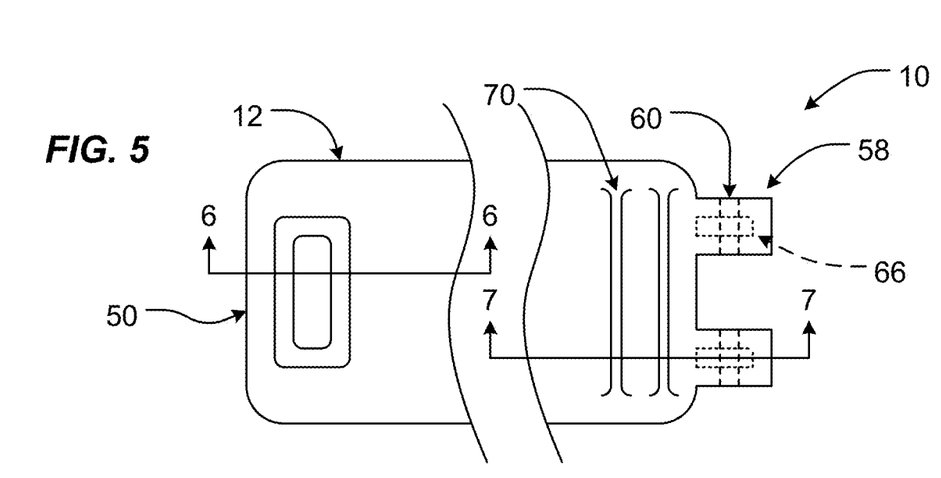
FIG. 5 is partial plan view of another embodiment of the injection molded member as a load floor.
Figure 6:
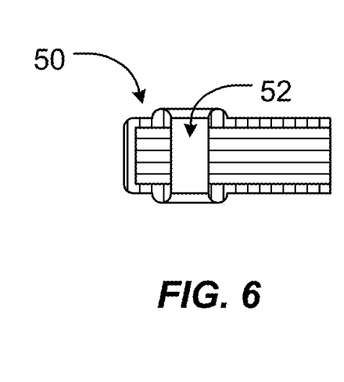
FIG. 6 is a partial cross-sectional view of the injection molded member of FIG. 5 taken along line 6-6 of FIG. 5.
Figure 7:
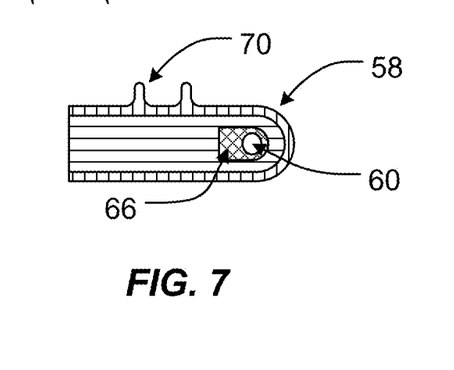
FIG. 7 is a partial cross-sectional view of the injection molded member of FIG. 5 taken along line 7-7 of FIG. 5.

Referring to FIGS. 5-7, as a load floor, the article 10, and more particularly the injection molded member 12, may include an integral handle 50 formed as one-piece with the injection molded member 12. A handle aperture 52 may be formed in the injection molded member 12 to better facilitate grasping of the integral handle 50.

The article 10, and more particularly the injection molded member 12, may also include one or more hinges 58 which are reinforced with a mold-in (i.e. insert-molded) reinforcement insert 66. As shown, the injection molded member 12, including the insert 12, may include a hinge pin aperture 60 for a hinge pin. The article 10, and more particularly the injection molded member 12, may also include ribs 70 to increase stiffness.

The injection molded parts herein may also be subject to integration with other parts, e.g., other vehicle trim components, as well as over-molded in which case the parts formed herein effectively serve as a substrate which may then be partially or fully covered by over-molding of a second material, during the manufacturing process.

As alluded to above, the polymeric compositions herein preferably include thermoplastic polymers, which also preferably contain reinforcing fiber. Even more preferably, it has been recognized that the polymeric compositions herein may include a selected amount of first resin having the preferred features of a selected melt strength and melt extensibility. Melt strength is understood herein is force required to extend the extruded melt of selected cross-sectional diameter of the selected rheometer to a break point. Melt extensibility is the rate of stretching the melt may experience without breaking. Accordingly, the preferred resins herein include those that provide relatively high melt strength and extensibility in the melt phase as employed in the injection molding procedures herein.

Preferably, the relatively high melt strength resin herein indicates a melt strength of greater than or equal to 20 centi-newtons (20 cn) or more preferably in the range of 20.0 cn to 200.0 cn, 20.0 cn to 100.0 cn, or 20.0 cn to 50.0 cn. Melt extensibility is preferably equal to or greater than 100 mm/sec, or more preferably in the range of 100 mm/sec to 300 mm/sec, or 100 mm/sec to 250 mm/sec, or 150 mm/sec to 250 mm/sec. The values of melt strength and/or melt extensibility herein are conveniently made with a Goettfert Rheograph 1000 or Rheograph 6000 triple bore capillary rheometer along with the Goettfert Rhoetens 71.97 Extensional Rheometer.

Accordingly, the polymeric compositions herein are even more preferably those that comprise: (a) a first polymer having a melt strength of greater than or equal to 20 cn, or more preferably 20 cn to 200.0 cn, and a melt extensibility equal to or greater than 100 mm/sec, or more preferably 100 mm/sec to 300 mm/sec, wherein said first polymer is preferably present at a level of 10.0% (wt) to 90.0% (wt), or 25.0% (wt) 75.0% (wt), or 40.0% (wt) to 60.0% (wt), or 45.0% (wt) to 55.0% (wt); (b) a second thermoplastic polymer having a melt flow index of greater than or equal to 10.0 g/10.0 minutes, more preferably in the range of 10.0 g/10.0 minutes to 40.0 grams/10 minutes, or 25.0 grams/10.0 minutes to 35.0 grams/10 minutes, wherein said second thermoplastic polymer is present at a level of 90.0% (wt.) to 10.0% (wt.); (c) reinforcing fiber, preferably at a level of 10.0% (wt.) to 40.0% (wt.), or even more preferably 15.0% (wt.) to 30.0% (wt.); and (d) foaming agent, more preferably at a level of 0.1% (wt.) to 10.0% (wt.), which foaming agent produces gas volumes of at least 20 cc/gram, or more preferably 20 cc/gram to 100 cc/gram, and which foaming agent may preferably be present at a level of up to 10.0% (wt.), or in the range of 0.1% (wt.) to 10.0% (wt.). Such parts also preferably indicate a flexural rigidity and/or instrumental impact performance as discussed more fully herein.

One example of a particularly preferred resin providing the above referenced melt strength and melt extensibility is a polypropylene resin, available from SABIC®, under the name SABIC® PP-UMS 561P. This resin was identified to have a melt strength of greater than or equal to 65 cN.

Such compositions noted above, and as discussed more fully below, were now found to be particularly suitable for use in the method herein of injection molding, where the compositions, along with a foaming agent, are injected into a molding cavity, having one or more locations with a preferred initial spacing in the range of 1.0 mm to 6.0 mm, and then increasing the molding cavity initial spacing at the one or more locations by 3.0 mm to 20.0 mm, and forming the injection molded part that includes a cellular structure.

Figure 8:
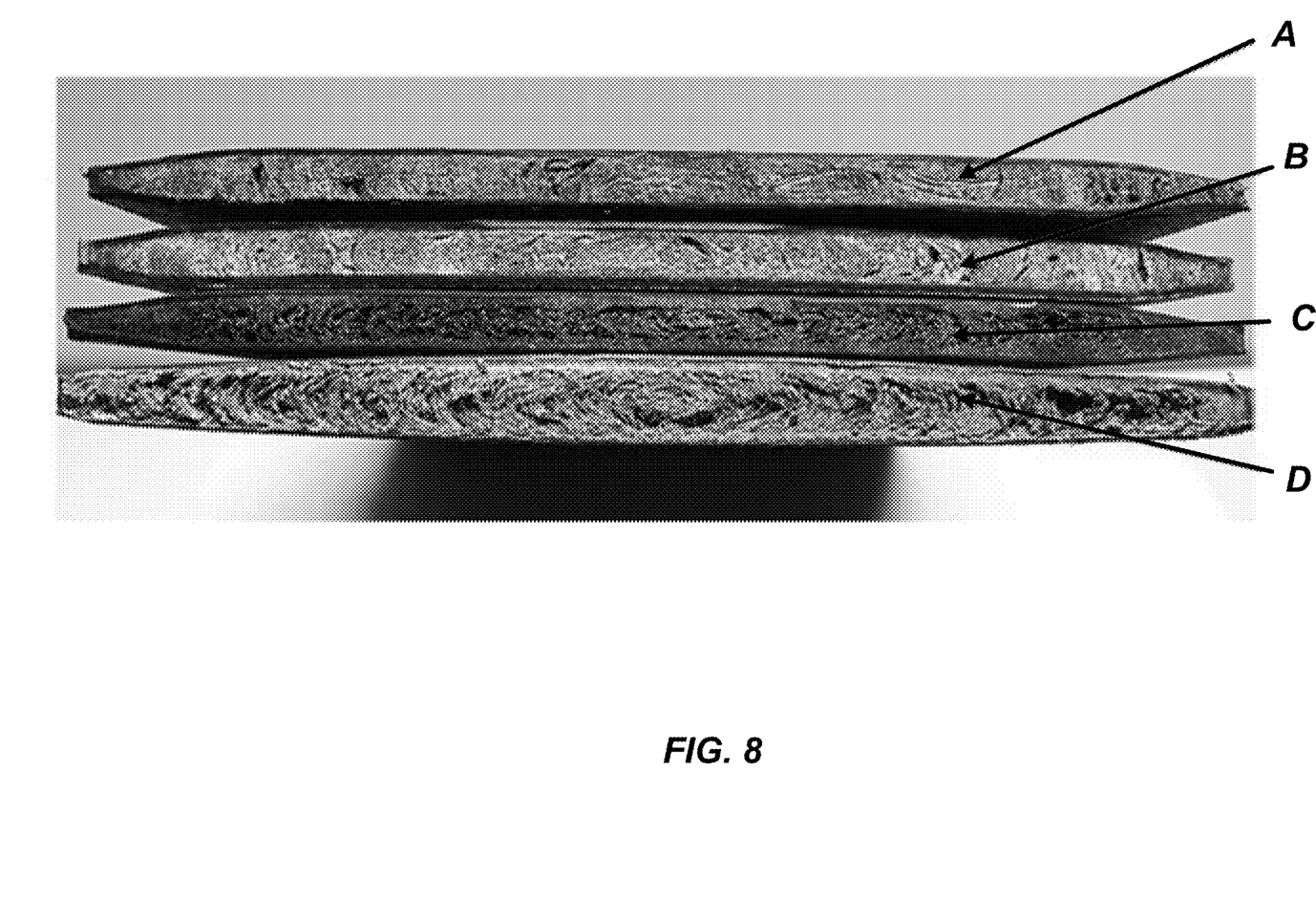
FIG. 8 provides cross-sectional views of parts "A", "B", "C" and "D" herein wherein the initial mold spacing is increased by retraction of the movable insert to provide density reduction and cellular formation.

By way of a representative and comparative working example, attention is now directed to FIG. 8 which provides cross-sectional views of parts herein wherein the initial mold spacing is increased by retraction of the movable insert to provide for density reduction and cellular formation. More specifically, in each of "A", "B", "C" and "D" shown in FIG. 8, the initial cavity spacing was 4.0 mm and such cavity spacing was increased to 8.0 mm. The skin thickness on the samples "A", "B", "C" and "D" ranged from 1.0 mm to 1.5 mm.

As shown at "A" and "B", the polymer composition contained 25.0% to 30.0% (wt.) of glass fiber in combination, 5.0% by wt. of a chemical, foaming agent, that as noted herein, provides a gas volume in the range of 20 cc/gram to 100 cc/gram, and the balance comprising a 50:50 blend of SABIC® PP-UMS 561P in combination with polypropylene homopolymer having a melt flow index of 35 grams/10 minutes For comparison purposed and Illustrated at "C" and "D" are parts produced just with polypropylene homopolymer having a melt flow index of 35 g/10 minutes, along with 20% by wt. of glass fiber, and 4.0% (wt.) chemical foaming agent. As can be observed in FIG. 8, samples "A" and "B" indicated relatively uniform microcellular structure. Comparative samples "B" and "C", indicated a relatively more fibrous foamed core and the skins were relatively easily separated from the core.

As noted above, the parts produced herein utilizing the combination of a relatively high melt strength polymer with the identified melt extensibility, in combination with thermoplastic polymer having a melt flow index of greater than or equal to 10 g/10 minutes, along with reinforcing fiber and foaming agent that produces gas volumes in the range of 20 cc/gram to 100 cc/gram, preferably provide a flexural rigidity and/or instrumental impact performance making them particularly suitable for a structural load bearing vehicle trim component. With regards to the instrumental impact performance, it is noted that the parts herein produced from the aforementioned composition, indicate multi-axial impact of 1.0 Joule total energy and 0.5 kN maximum load to a 50.0 Joule total energy and 4.0 kN maximum load. More preferably, the parts indicate a multi-axial impact of 15.0 Joule total energy to 50.0 Joule total energy and 2.0 kN maximum load to 4.0 kN maximum load. Such instrumental impact is measured according to ISO-6603-2 (April 2019). One example of instrumental impact test equipment includes the Instron Dynatup 9250HV multiaxial impact tester.

Moreover, the flexural rigidity of the parts produced herein was determined, where flexural rigidity is a parameter that is geometric specific and therefore is determined by the product of the elastic modulus×the "second moment of area." The "second moment of area" is also known as the moment of inertia of a shape. It is also recognized as a measure of the efficiency of a cross-sectional shape to resist bending by loading. For a given geometry, such as a plaque, the second moment of area "I" may be determined by the following equation; $I=\frac{1}{12}\times(\text{width of the plaque})\times\text{thickness}^3$. The flexural rigidity (FR) for such geometry may then be determined by the following expression: FR=Elastic Modulus×Second Moment of Area. Accordingly, for the above referenced compositions that utilized the above preferred relatively high melt strength resin of a polypropylene resin, at a starting thickness in the range of 1.0 mm to 6.0 mm that is expanded in the range of 3.0 mm to 20.0 mm, where the elastic modulus is assigned to be about 1500 MPa, the flexural rigidity will fall in the range of 0.500 $Nm^2$ to 150 $Nm^2$.

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

LIST OF REFERENCE CHARACTERS

10 article
12 injection molded member
14 cushion member
16 decorative cover member
22 outer (skin) layer
24 outer (skin) layer
25 region with little to no density reduction
26 intermediate (core) layer
27 skin layer
50 handle
52 handle aperture
58 hinge
60 hinge pin aperture
66 insert
70 ribs
100 molding apparatus
110 mold
112 first mold half
114 second mold half
117 initial mold cavity spacing
118 molding cavity after retraction of movable mold insert
122 first mold half molding surface
124 second mold half molding surface
130 hot runner
140 movable insert
142 movable insert
144 movable insert
200 injection molding machine
202 injection unit

What is claimed is:

1. A method of forming an injection molded part comprising:
    providing an injection mold comprising a first mold half and a second mold half that provides a molding cavity between the first mold half and the second mold half, wherein the molding cavity includes one or more locations having an initial spacing;
    injecting a polymer composition into the molding cavity, the polymer composition comprising: (a) a first polymer having a melt strength of greater than or equal to 20.0 cn and a melt extensibility of greater than or equal to 100 mm/sec; (b) a second thermoplastic polymer having a melt flow index of greater than or equal to 10.0 g/10.0 minutes; (c) reinforcing fiber; (d) a foaming agent;
    increasing said molding cavity initial spacing at said one or more locations; and
    forming the injection molded part in the molding cavity from the polymer composition wherein the injection molded part includes a cellular structure.

2. The method of claim 1 wherein said first polymer having a melt strength of greater than or equal to 20 cn and a melt extensibility of greater than or equal to 100 mm/sec is present in said polymer composition at a level of 10.0% (wt.) to 90.0% (wt.) and said second thermoplastic polymer is present in said polymer composition at a level of 90.0 wt. % to 10.0 wt. %.

3. The method of claim 1 wherein said initial spacing is in the range of 1.0 mm to 6.0 mm.

4. The method of claim 1 wherein said increase in said mold cavity initial spacing is in the range of 3.0 mm to 20.0 mm.

5. The method of claim 1 wherein said initial spacing is in the range of 1.0 mm to 6.0 mm and said increase in said mold cavity initial spacing is in the range of 3.0 mm to 20.0 mm.

6. The method of claim 1 wherein said first polymer having a melt strength of greater than or equal to 20.0 cn has a melt strength in the range of 20.0 cn to 200.0 cn.

7. The method of claim 1 wherein said first polymer having a melt extensibility of greater than or equal to 100 mm/sec has a melt extensibility in the range of 100 mm/sec to 300 mm/sec.

8. The method of claim 1 wherein said second thermoplastic polymer having a melt flow index of greater than or equal to 10.0 g/10.0 minutes has a melt flow index in the range of 10.0 g/10.0 minutes to 40.0 g/10.0 minutes.

9. The method of claim 1 wherein said reinforcing fiber is present at a level of 10.0% (wt.) to 40.0% (wt.).

10. The method of claim 1 wherein said foaming agent produces gas volumes of at least 20 cc/gram.

11. The method of claim 1 wherein said foaming agent produces gas volumes in the range of 20 cc/gram to 100 cc/gram.

12. The method of claim 1 wherein said injection molded part having cellular structure indicates 1.0-50.0 Joule total energy and 0.5 kN to 4.0 kN maximum load according to ISO-6603-2 (April 2019).

\* \* \* \* \*